Patented Sept. 19, 1950

2,522,580

UNITED STATES PATENT OFFICE 2,522,580

CELLULOSE ESTERS

Mervin E. Martin and Troy M. Andrews, Cumberland, Md., assignors to Celanese Corporation of America, a corporation of Delaware No Drawing. Application February 28, 1947, Serial No. 731,709

6 Claims. (Cl. 260—230)

This invention relates to the filtration of solutions of cellulose acetate or other organic acid esters of cellulose and relates more particularly to the filtration of acid solutions of ripened cellulose acetate or other organic acid esters of cellulose whereby cellulose acetate or other organic acid esters of cellulose of improved clarity and freedom from haze are produced.

An object of this invention is the provision of an improved filtration process for the rapid filtration of acid solutions of ripened cellulose acetate or other organic acid esters of cellulose.

Another object of this invention is the filtration of acid solutions of ripened cellulose acetate or other organic acid esters of cellulose employing as the filtration medium crystalline material of a particular crystalline structure formed in situ in said solution as a product of the neutralization of the acid esterification and ripening catalyst.

Other objects of this invention will appear from the following detailed description.

In the preparation of organic acid esters of cellulose, the esterification of the cellulose is usually carried out by treating cellulose with an organic acid anhydride in the presence of an inorganic acid esterification catalyst, such as sulfuric acid, and an organic acid diluent, or solvent, for the cellulose ester being formed. The fully esterified cellulose ester is obtained in the form of a viscous, homogeneous solution in the organic acid diluent or solvent. Water is then added in an amount sufficient to convert any organic acid anhydride remaining to the corresponding acid, at least part of the catalyst present is neutralized in a suitable manner, an additional amount of water for ripening is then added and the solution obtained is allowed to stand and to hydrolyze or ripen until the cellulose ester has the desired solubility characteristics. The cellulose ester is then precipitated from solution by the addition of an excess of water or other non-solvent thereto, washed neutral and dried.

Thus, in the preparation of cellulose acetate of improved stability in accordance with the above process cellulose, with or without an activating pretreatment with organic acids or organic acids containing some sulfuric acid, is acetylated by treatment with acetic anhydride and an esterification catalyst, such as sulfuric acid, in the presence of glacial acetic acid as a solvent for the cellulose acetate formed. At the completion of esterification, the acetic anhydride remaining is converted to acetic acid by the addition of water to the viscous reaction mixture, at least part of the free sulfuric acid present is neutralized by the use of a suitable neutralizing agent and, after additional water for ripening is added, the cellulose acetate in solution is heated to a temperature of 60° C. to 160° C. and then allowed to stand and to ripen rapidly to the desired solubility characteristics and acetyl value. The ripened cellulose acetate may then be precipitated from the hot solution, after the remaining catalyst is neutralized, by the addition thereto of an excess of water or other non-solvent, and the precipitated cellulose acetate then washed neutral, stabilized further, if necessary, by being heated with water at elevated temperature and pressure, and then dried. The cellulose acetate prepared in this manner may be employed with excellent results for the production of yarns, for the preparation of thermoplastic molding compositions, and films.

It has been observed, however, that cellulose acetates prepared in this way are not entirely suitable for the production of transparent sheet materials or of thermoplastic molded products where extremely high clarity and freedom from haze are desired. The ripened solution of cellulose acetate normally contains incompletely esterified cellulose fibers, inorganic salts resulting from the neutralization of the sulfuric acid catalyst, dirt and other foreign matter. When the ripened cellulose acetate is precipitated from solution, these materials become occluded in the precipitated cellulose acetate. Washing is of little or no effect in removing much of this very finely divided, occluded material and the presence of the latter in the cellulose acetate not only impairs the clarity of the products produced therefrom but also imparts a definite haze to said products.

It has been proposed that the haze-forming materials and the materials interfering with the clarity of the cellulose acetate obtained be removed by filtering the ripened solution of cellulose acetate prior to precipitation. However, no appreciable success has been attained. Due to the high viscosity of the solution of ripened cellulose acetate in acetic acid, it is necessary to dilute the solution with water or aqueous acetic acid prior to filtration to reduce the viscosity sufficiently to permit a ready flow through the filter press. Even after dilution, it has been found that the very fine crystalline salts present, which form as a product of the neutralization of the sulfuric acid catalyst by the neutralizing agent employed, tend to clog the pores of the filter dressing quite rapidly. After a short time the rate of flow is reduced so substantially that the filtration is no longer commercially feasible. Increased dilution to bring these crystalline salts completely into solution has also been suggested but the size of the haze-forming components is so microscopic that the usual filter dressings or fibrous filter aids are of no substantial value beyond effecting the removal of the grosser foreign particles.

We have now found that the filtration of hot acid solutions of ripened cellulose acetate, or other ripened organic acid ester of cellulose, which have been ripened rapidly at an elevated temperature of 60 to 160° C. may be substantially improved, and cellulose acetate, or other organic acid esters of cellulose, materials yielding products of extremely high clarity and unusual freedom from haze may be obtained therefrom by a novel filtration procedure. In accordance with our novel process, these advantageous results may be obtained if the filtration of the ripened cellulose acetate solution is effected by employing a filter aid comprising long, thin, needle-shaped magnesium sulfate crystals, which crystals are formed in situ as a product of the neutralization of the sulfuric acid catalyst with a suitable magnesium salt. To form magnesium sulfate crystals of the desired physical structure, in carrying out said novel filtration process, at least part of the sulfuric acid esterification catalyst is neutralized prior to ripening by employing a suitable magnesium salt, the neutralized solution of cellulose acetate is heated and ripened rapidly to the desired acetyl value at a temperature of 60° to 160° C., any remaining sulfuric acid is neutralized, the hot, ripened cellulose acetate solution is diluted with an aqueous solution of acetic acid, and the diluted solution is then cooled rapidly. The dilution and rapid cooling is followed by a period of standing to permit maximum crystal growth which causes magnesium sulfate crystals of the desired long, thin, needle-shaped crystalline structure to be formed. When filtration is effected through a suitable fine woven wire mesh or through a fabric filter dressing, the long, thin, needle-shaped sulfate crystals build up a layer thereon which forms an extraordinarily effective filter aid. Not only does the said crystalline layer act to filter out the extremely fine particles which produce haze and which impair clarity but the nature of the crystalline layer is such that it is highly resistant to clogging. Consequently, the flow through the crystal filter layer or bed remains at a satisfactorily high rate for a substantial period of time, a highly advantageous feature of our invention.

The fact that rapid cooling of the neutralized dilute ripened cellulose acetate solution followed by a standing period for the cooled ripened solution favors the formation of larger magnesium sulfate crystals than are formed when the dilute, ripened cellulose acetate solution is cooled slowly is quite surprising since, in general, the growth of large crystals of inorganic salts is normally favored by a slow and gradual decrease in temperature of the saturated salt solution in which said crystals are formed. In fact, we have found that slow and gradual cooling produces a large number of relatively small crystals of which a substantial proportion are diamond-shaped and wholly unsuited for our novel filtration process. We believe that our novel result may be attributed to the fact that relatively few magnesium sulfate crystal nuclei are initially present in the hot, ripened colloidal solution of cellulose acetate. When the solution is cooled rapidly the formation of additional crystal nuclei is hindered and the growth of those crystal nuclei already present is favored. Thus, instead of a great many relatively small, diamond-shaped crystals being formed, a lesser number of relatively larger crystals are formed which are long, thin and needle-shaped. It is the crystals of the latter structure which we have found act as an improved filter aid or filter medium. The foregoing explanation of the mechanism of the crystal growth, is, however, purely a theoretical one and we do not wish to be bound thereby.

The neutralization of the sulfuric acid catalyst is effected, as stated, by employing a suitable magnesium salt as the neutralizing agent whereby a double decomposition takes place and magnesium sulfate is formed. Preferably, we employ a solution of magnesium acetate in aqueous acetic acid as the neutralizing agent. The use of aqueous acetic acid as the solvent for the magnesium acetate permits the said neutralizing agent to be added rapidly without any danger of local precipitation of the ripened cellulose acetate in solution. At least part of the sulfuric acid catalyst is neutralized at the completion of acetylation and prior to ripening with the remainder being neutralized after ripening has been completed.

After the desired quantity of neutralizing agent has been added to neutralize at least part of the sulfuric acid catalyst in the hot, ripened cellulose acetate solution, which is usually at a temperature of 60 to 160° C. at the completion of ripening, the solution is diluted with 20 to 80 parts by weight of 20 to 80% by weight aqueous acetic acid and then cooled rapidly to a temperature of 20 to 50° C. Most advantageously, however, the acetic acid diluent is cooled to a temperature of −15° to +20° C., and preferably to about −12° C., before being added to the hot, neutralized, ripened cellulose acetate solution so that a very rapid cooling is effected by the dilution and the temperature is immediately brought down to about 45 to 50° C. due to the cooling action of the refrigerated diluent. The rapidly cooled, ripened cellulose acetate solution is then cooled further over the course of 30 to 120 minutes to about 25 to 40° C. Cooling may also be effected by employing a vessel provided with a stirrer and a jacket through which a suitable refrigerant may be circulated. After being cooled to 25° to 40° C. the solution is allowed to stand at this temperature for ¼ to 16 hours for maximum crystal growth. Any diamond-shaped crystals originally present usually disappear during this standing period. When the magnesium sulfate crystals have reached the desired size, the ripened solution of cellulose acetate is then passed through a suitable plate and frame filter press or other filter provided with fabric filter cloths or, more preferably, with filter cloths or screens of fine wire mesh. The cloth or wire screen filters out the long magnesium sulfate crystals, causing the formation of the desired crystal filter layer or bed, and the filter layer so formed acts as the filter medium to produce the desired high clarity and haze-free cellulose acetate.

In order further to illustrate our invention, but without being limited thereto, the following examples are given:

*Example I*

100 parts by weight of cotton linters are pretreated for 3 hours at 25° C. with a mixture of 35 parts by weight of glacial acetic acid, 0.5 part by weight of sulfuric acid and 0.5 part by weight of water and the pretreated cotton linters then entered into an acetylizer containing a mixture of 245 parts by weight of acetic anhydride, 325 parts by weight of glacial acetic acid and 11.5 parts by weight of sulfuric acid cooled to —10° C. The temperature rises to a peak of about 35° C. after one hour and acetylation is completed in about 2 hours. Sufficient water is added to convert any of the acetic anhydride remaining to acetic acid, 11.5 parts of the sulfuric acid present are neutralized with a solution of magnesium acetate in aqueous acetic acid and 43 parts of water are then added for ripening. The temperature of the primary cellulose acetate solution is raised to 100° C. and is ripened for 6 hours at this temperature, or until the ripened cellulose acetate has an acetyl value of 56%, calculated as acetic acid. Any sulfuric acid present which has been split off during ripening is then neutralized by adding a further quantity of magnesium acetate in aqueous acetic acid. The hot, ripened and neutralized solution of cellulose acetate is then diluted by rapidly adding thereto an amount of cold 40% aqueous acetic acid equal to 60% by weight of the ripened solution, the diluent being cooled to —12° C. before addition. The temperature is immediately brought down to about 50° C. by the dilution and the solution then cooled rapidly to 35° C. over the course of 60 minutes. The rapid cooling causes the formation of many long, thin, needle-shaped magnesium sulfate crystals. After standing for 6 hours, the solution is then filtered through 80 x 80 mesh stainless steel wire screening. The average rate of flow per 100 square feet of surface is 2000 pounds of solution per hour over a total filtration time of 10 hours. The cellulose acetate is then precipitated from the filtered solution by the addition of a large excess of water thereto, washed neutral with demineralized water and dried. When 6 parts by weight of the cellulose acetate are dissolved in 100 parts by volume of a solvent consisting of 95/5 ethyl alcohol/water, the solution obtained has a transparency of 97. The transparency is measured by a Lumetron. Solutions of 6 parts by weight of the cellulose acetate in 100 parts by volume of 95/5 acetone/water have a clarity of 97, as measured by the same device. Discs molded of this cellulose acetate plasticized with 10 to 15% by weight of a suitable plasticizer, such as diethyl phthalate, yield molded articles of unusual clarity and freedom from haze.

*Example II*

100 parts by weight of cotton linters are pretreated for 5 hours at 25° C. with a mixture of 30 parts by weight of 99.8% propionic acid, 11 parts by weight of 85% formic acid and 0.55 part by weight of sulfuric acid and the pretreated cotton linters then entered into a reactor containing a mixture of 400 parts by weight of 97% propionic acid anhydride and 1.65 parts by weight of sulfuric acid cooled to —15° C. The temperature rises to a peak of about 30° C. after 3½ hours, and becomes fairly clear as shown under a microscope, after a total of about 5 hours' esterification time. 315 parts by weight of 99.8% propionic acid is stirred into the batch and the reaction continued until a clear solution is obtained after about 8 hours total esterification time. Sufficient water is added to convert any of the propionic anhydride remaining to propionic acid and 15 parts of water are then added for ripening. The temperature of the primary cellulose propionate solution is raised to 60° C. while 40 parts of water are slowly added as the temperature is raised to 60° C. The temperature is held at 60° C. for 4 hours or until the ripened cellulose propionate has a propionyl value of 63 per cent, calculated as propionic acid. The sulfuric acid in the ripened cellulose propionate solution is then neutralized completely, by the addition thereto of a solution of magnesium propionate in aqueous propionic acid. The hot, ripened solution of cellulose propionate is then diluted with 50% on the weight thereof of a 40% by weight aqueous solution of propionic acid at —10° C., and the solution cooled rapidly to 35° C. The dilution and rapid cooling causes the formation of the desired long, thin, needle-shaped magnesium sulfate crystals. After standing for 8 hours to promote maximum crystal growth, the solution is filtered through a 24 x 110 mesh stainless steel wire cloth. The average rate of flow obtained is 1500 pounds of solution per hour per 100 square feet of surface over the course of 10 hours. The cellulose propionate in the filtered solution is then precipitated by the addition thereto of an excess of water, washed to 0.06% acidity and either boiled to stabilize or washed with distilled water and dried. When dissolved in 98/2 acetone/water, solutions of unusually high clarity and transparency are obtained.

While the novel process of our invention has been described more particularly with respect to the filtration and clarification of acid solutions of ripened cellulose acetate and cellulose propionate, it is to be understood that equally valuable results may be obtained by similarly treating the ripened acid solutions obtained in the production of other organic acid esters of cellulose such as, for example, cellulose butyrate, cellulose acetate-propionate, and cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. In a process for the production of lower aliphatic acid esters of cellulose of improved clarity and freedom from haze wherein cellulose is esterified with a lower aliphatic acid anhydride employing sulfuric acid as esterification catalyst and an organic acid as solvent for the lower aliphatic acid ester of cellulose, and the lower aliphatic acid ester of cellulose is ripened to the desired acyl value at an elevated temperature after neutralization of at least part of the sulfuric acid esterification catalyst, the steps which comprise neutralizing the acid catalyst with a magnesium salt of an organic acid, selected from the group consisting of acetic, propionic and butyric acids, diluting the neutralized, ripened solution with an aqueous solution of said organic acid solvent, cooling the neutralized, heated, ripened solution of said lower aliphatic acid ester of cellulose rapidly whereby long, needle-shaped crystals of magnesium sulfate are formed, and then filtering the lower aliphatic acid ester of cellulose solution through a layer of said long, needle-shaped magnesium sulfate crystals.

2. In a process for the production of cellulose acetate of improved clarity and freedom from haze, wherein cellulose is esterified with acetic anhydride employing sulfuric acid as catalyst and acetic acid as a solvent for the cellulose acetate formed and the cellulose acetate is ripened to the desired acetyl value at an elevated temperature after neutralizing at least part of the sulfuric acid catalyst, the steps which comprise neutralizing the sulfuric acid catalyst with magnesium acetate, diluting the neutralized, heated, ripened solution of cellulose acetate rapidly with said acetic acid solvent whereby long, needle-shaped crystals of magnesium sulfate are formed, and then filtering the cellulose acetate solution through a layer of said long, needle-shaped magnesium sulfate crystals.

3. In a process for the production of cellulose propionate of improved clarity and freedom from haze, wherein cellulose is esterified with propionic acid anhydride employing sulfuric acid as catalyst and propionic acid as solvent for the cellulose propionate formed, the cellulose propionate is ripened to the desired propionyl value at an elevated temperature and the sulfuric acid catalyst is neutralized, the steps which comprise neutralizing the sulfuric acid catalyst with magnesium propionate, diluting the neutralized, ripened solution with an aqueous solution of propionic acid, cooling the neutralized, hot, ripened solution rapidly whereby long, needle-shaped crystals of magnesium sulfate are formed, and then filtering the cellulose propionate solution through a layer of said long, needle-shaped magnesium sulfate crystals.

4. In a process for the production of cellulose acetate of improved clarity and freedom from haze, wherein cellulose is esterified with acetic anhydride employing sulfuric acid as catalyst and acetic acid as a solvent for the cellulose acetate formed and the cellulose acetate is ripened to the desired acetyl value at an elevated temperature after neutralizing at least part of the sulfuric acid catalyst, the steps which comprise neutralizing the sulfuric acid catalyst with magnesium acetate, diluting the neutralized, ripened solution with an aqueous solution of acetic acid, cooled to a temperature of $-15°$ C. to $+20°$ C., further cooling the neutralized, ripened solution of cellulose acetate rapidly, allowing the cooled solution to stand whereby long, needle-shaped crystals of magnesium sulfate are formed and then filtering the cellulose acetate solution through a bed of said long, needle-shaped magnesium sulfate crystals.

5. In a process for the production of cellulose acetate of improved clarity and freedom from haze, wherein cellulose is esterified with acetic anhydride employing sulfuric acid as catalyst and acetic acid as a solvent for the cellulose acetate formed and the cellulose acetate is ripened to the desired acetyl value at an elevated temperature after neutralizing at least part of the sulfuric acid catalyst, the steps which comprise neutralizing the sulfuric acid catalyst with magnesium acetate, diluting the neutralized, ripened solution with 20 to 80 parts by weight of a 20 to 80% by weight aqueous solution of acetic acid cooled to a temperature of $-15°$ C. to $+20°$ C., further cooling the neutralized, ripened solution of cellulose acetate rapidly to a temperature of 20 to 50° C., allowing the cooled solution to stand whereby long, needle-shaped crystals of magnesium sulfate are formed, and then filtering the cellulose acetate solution through a layer of said long, needle-shaped magnesium sulfate crystals.

6. In a process for the production of a cellulose propionate of improved clarity and freedom from haze, wherein cellulose is esterified with propionic acid anhydride employing sulfuric acid as catalyst and propionic acid as solvent for the cellulose propionate formed, the cellulose propionate is ripened to the desired propionyl value at an elevated temperature and the sulfuric acid catalyst is neutralized, the steps which comprise neutralizing the sulfuric acid catalyst with magnesium propionate, diluting the neutralized, ripened solution with 50% on the weight thereof of a 40% by weight aqueous solution of propionic acid at $-10°$ C., cooling the neutralized, hot, ripened solution rapidly to 35° C., allowing the solution to stand whereby long, needle-shaped crystals of magnesium sulfate are formed, and then filtering the cellulose propionate solution through a layer of said long, needle-shaped magnesium sulfate crystals.

MERVIN E. MARTIN.
TROY M. ANDREWS.

REFERENCES CITED

The following references are of record in the file of this patent:

UNITED STATES PATENTS

| Number | Name | Date |
|---|---|---|
| 1,860,461 | Hubert et al. | May 31, 1932 |
| 2,177,903 | Martin | Oct. 31, 1939 |
| 2,329,704 | Dreyfus et al. | Sept. 21, 1943 |